(12) United States Patent  
Gu et al.

(10) Patent No.: US 12,362,357 B2
(45) Date of Patent: Jul. 15, 2025

(54) HIGH-ENTROPY POSITIVE ELECTRODE MATERIAL, PREPARATION METHOD AND APPLICATION THEREOF

(71) Applicant: NINGBO INSTITUTE OF MATERIALS TECHNOLOGY AND ENGINEERING, CHINESE ACADEMY OF SCIENCES, Zhejiang (CN)

(72) Inventors: Qingwen Gu, Zhejiang (CN); Yaletu Saixi, Zhejiang (CN); Bao Qiu, Zhejiang (CN); Zhaoping Liu, Zhejiang (CN)

(73) Assignee: NINGBO INSTITUTE OF MATERIALS TECHNOLOGY AND ENGINEERING, CHINESE ACADEMY OF SCIENCES, Zhejiang (CN)

( * ) Notice: Subject to any disclaimer, the term of this patent is extended or adjusted under 35 U.S.C. 154(b) by 610 days.

(21) Appl. No.: 17/636,877

(22) PCT Filed: Mar. 1, 2021

(86) PCT No.: PCT/CN2021/078398
§ 371 (c)(1),
(2) Date: Feb. 20, 2022

(87) PCT Pub. No.: WO2022/170648
PCT Pub. Date: Aug. 18, 2022

(65) Prior Publication Data
US 2023/0163290 A1 May 25, 2023

(30) Foreign Application Priority Data
Feb. 10, 2021 (CN) .......... 202110183314.X

(51) Int. Cl.
*H01M 4/525* (2010.01)
*C01G 53/50* (2025.01)
(Continued)

(52) U.S. Cl.
CPC ............ *H01M 4/525* (2013.01); *C01G 53/50* (2013.01); *H01M 4/505* (2013.01);
(Continued)

(58) Field of Classification Search
CPC ........ H01M 4/505; H01M 4/525; C01G 53/50
See application file for complete search history.

(56) References Cited

U.S. PATENT DOCUMENTS 11,309,543 B2 * 4/2022 Huang ................ C01G 53/006
2011/0076556 A1 3/2011 Karthikeyan et al.
(Continued)

FOREIGN PATENT DOCUMENTS

| CN | 102769128 A | 11/2012 |
| CN | 103069622 A | 4/2013 |

(Continued)

OTHER PUBLICATIONS

The Japanese 1st Office Action issued on May 16, 2023 for JP2022-511376.
(Continued)

*Primary Examiner* — Amanda C. Walke
(74) *Attorney, Agent, or Firm* — Yue (Robert) Xu; Apex Attorneys at Law, LLP

(57) ABSTRACT

Provided is a high-entropy positive electrode material, preparation method and application thereof. The high-entropy positive electrode material has a general formula as shown in the following formula: $Li_{1+a}A_xB_yC_zD_bO_2M_cN_d$, wherein A is a metallic element having a valence of +2, B is a metallic element having a valence of +3, C is a metallic element having a valence of +4, D is a metallic element
(Continued)

having a valence of +5, M is an element having a valence of +7, and N is an element having a valence of +8; and $0 \leq a<1$, $0<x<1$, $0<y<1$, $0<z<1$, $0<b<1$, $0<c<1$, $d>0$. This high-entropy positive electrode material is designed from the structure of the material itself. Compared with the conventional positive electrode materials, it has high specific discharge capacity and has a stable structure during the cycling without oxygen evolution.

4 Claims, 1 Drawing Sheet

(51) Int. Cl.
  *H01M 4/505* (2010.01)
  *H01M 10/052* (2010.01)
  *H01M 4/02* (2006.01)
(52) U.S. Cl.
  CPC ....... *H01M 10/052* (2013.01); *C01P 2002/52* (2013.01); *C01P 2004/84* (2013.01); *C01P 2006/40* (2013.01); *H01M 2004/028* (2013.01)

(56) References Cited

U.S. PATENT DOCUMENTS

| | | |
|---|---|---|
| 2012/0282521 A1 | 11/2012 | Choi et al. |
| 2013/0209871 A1 | 8/2013 | Kato et al. |
| 2015/0010823 A1 | 1/2015 | Yu et al. |
| 2015/0079471 A1 | 3/2015 | Fang et al. |
| 2018/0006302 A1 | 1/2018 | Li et al. |
| 2019/0036113 A1 | 1/2019 | Ishikawa et al. |
| 2021/0020931 A1 | 1/2021 | Huang et al. |
| 2021/0057742 A1 | 2/2021 | Ikeuchi et al. |

FOREIGN PATENT DOCUMENTS

| | | | |
|---|---|---|---|
| CN | 105938917 A | | 9/2016 |
| CN | 110350185 A | * | 10/2019 |
| CN | 110556536 A | | 12/2019 |
| CN | 111082041 A | | 4/2020 |
| CN | 111377487 A | | 7/2020 |
| CN | 111435739 A | | 7/2020 |
| CN | 111525104 A | | 8/2020 |
| CN | 111584872 A | | 8/2020 |
| CN | 111668475 A | | 9/2020 |
| CN | 116190609 A | * | 5/2023 |
| JP | 2002216759 A | | 8/2002 |
| JP | 2007048711 A | | 2/2007 |
| JP | 2014222582 A | | 11/2014 |
| JP | 2015015244 A | | 1/2015 |
| JP | 2016071967 A | | 5/2016 |
| JP | 2019029343 A | | 2/2019 |
| KR | 20110076955 A | * | 7/2011 |
| KR | 20120099375 A | | 9/2012 |
| KR | 20190136763 A | * | 12/2019 |
| WO | 2018090956 A1 | | 5/2018 |
| WO | 2020012739 A1 | | 1/2020 |

OTHER PUBLICATIONS

International Search Report for PCT/CN2021/078398 mailed May 27, 2021, ISA/CN.
Lun ZY et al., Cation-disordered rocksalt-type high-entropy cathodes for Li-ion batteries, Nature Materials vol. 20,Oct. 12, 2020, pp. 214-224.
The Korean 1st Office Action issued on Sep. 26, 2024 for KR10-2022-7006453.

* cited by examiner

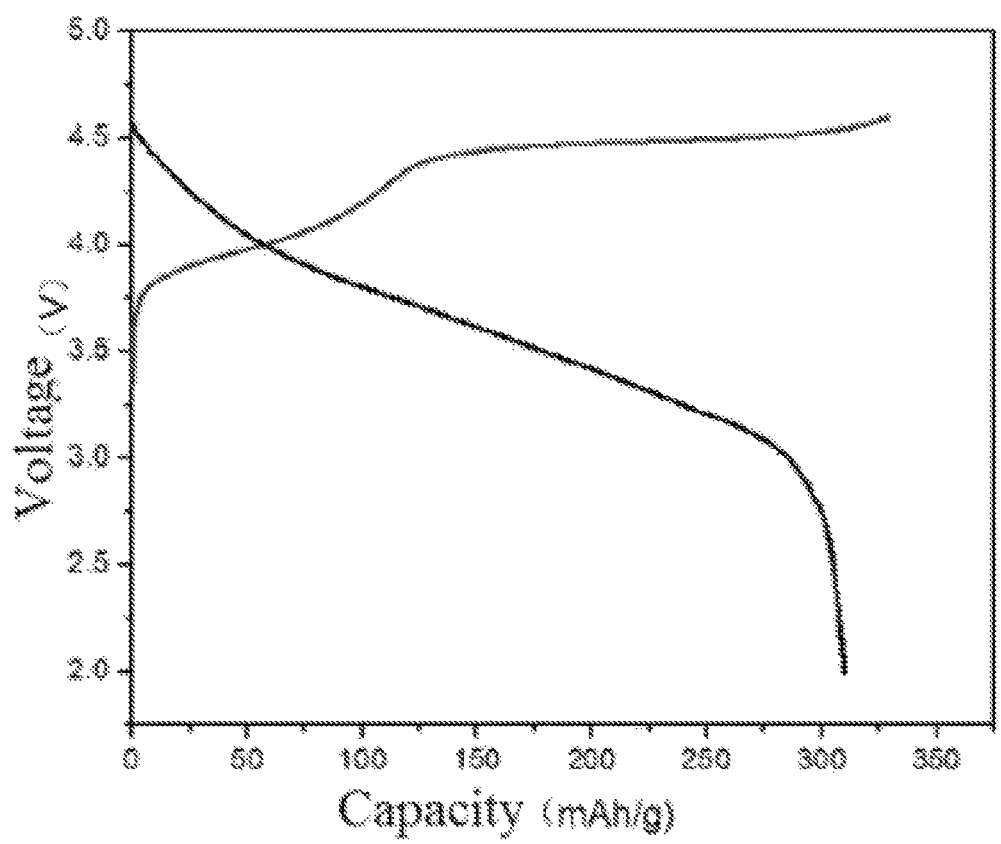

HIGH-ENTROPY POSITIVE ELECTRODE MATERIAL, PREPARATION METHOD AND APPLICATION THEREOF

This application is the national phase of International Application No. PCT/CN2021/078398, titled "HIGH-ENTROPY POSITIVE ELECTRODE MATERIAL, PREPARATION METHOD AND APPLICATION THEREOF", filed on Mar. 1, 2021, which claims the priority to Chinese Patent Application No. 202110183314.X, titled "HIGH-ENTROPY POSITIVE ELECTRODE MATERIAL PREPARATION METHOD AND APPLICATION THEREOF", filed on Feb. 10, 2021, with the China National Intellectual Property Administration, which is incorporated herein by reference in entirety.

FIELD

The present disclosure relates to the technical field of lithium batteries, and more specifically to a high-entropy positive electrode material, preparation method and application thereof.

BACKGROUND

In recent years, with the rapid development of various consumer electronics such as smart phones, tablets, and electronic bracelets, the rapid growth of the energy-saving and eco-friendly electric vehicle market, and the emergence of the energy storage battery market, lithium-ion batteries as the power source of these products have been developed rapidly. Lithium-ion batteries are a kind of secondary battery with the characteristics of green environmental protection, high energy density and long cycle life. With the expansion of using lithium-ion battery and increasing degree of dependence, the requirements for performance indicators of lithium-ion batteries in all aspects are getting higher and higher, especially in energy density and safety performance. In terms of energy density, lithium-ion batteries with high energy density often require positive electrode and negative electrode materials with high specific energy. In the existing positive electrode material systems with high specific energy, positive electrode materials for lithium-ion batteries, such as high nickel materials, and lithium-rich manganese-based positive electrode materials, have attracted wild attention due to their high specific capacity, but these materials often bring problems of safety, gas generation during the cycling, and poor cycle stability.

In order to solve the problem of poor cycle stability in the battery system with high specific energy, especially the problem of gas generation in full batteries, many researches including doping of the positive electrode material and interface treatment such as surface coating, have been carried out at home and abroad in recent years. However, most of the work is only to delay the time of oxygen release from the material, but cannot fundamentally solve the problem of gas generation during the material cycling.

SUMMARY

In view of that, an object of the present disclosure is to provide a high-entropy positive electrode material, a preparation method and application thereof. Compared with the conventional positive electrode material, the high-entropy positive electrode material provided by the present disclosure has a higher discharge specific capacity and a stable structure during the cycling without oxygen generation.

The present disclosure provides a high-entropy positive electrode material, having a general formula as shown in Formula (I):

$$Li_{1+a}A_xB_yC_zD_bO_2M_cN_d \qquad \text{Formula (I);}$$

wherein in Formula (I), A is a metallic element having a valence of +2, B is a metallic element having a valence of +3, C is a metallic element having a valence of +4, D is a metallic element having a valence of +5, M is an element having a valence of +7, and N is an element having a valence of +8; and $0 \leq a < 1$, $0 < x < 1$, $0 < y < 1$, $0 < z < 1$, $0 < b < 1$, $0 < c < 1$, $d > 0$.

Preferably, the metallic element having a valence of +2 comprises one or more of Ni, Be, Mg, Ca, Sr and Ba; the metallic element having a valence of +3 comprises one or more of Co and Al; the metallic element having a valence of +4 comprises s one or more of Mn, Al, Ti and Zr; the metallic element having a valence of +5 comprises one or more of Nb, V and T; and the element having a valence of +7 comprises one or more of F and Cl.

Preferably, the element having a valence of +8 is lattice oxygen.

Preferably, the high-entropy positive electrode material contains an oxygen element having both oxygen having a valence of +6 and oxygen having a valence of +8.

The present disclosure further provides a preparation method of the high-entropy positive electrode material described in the above technical solution, comprising the following steps:

a) synthetizing a precursor containing one or more of A, B, C, D and M through coprecipitation;

b) mixing the precursor obtained in step a) with lithium, and at the same time with one or more oxides containing A, B, C, D, or M, and then sintering to obtain a high-entropy lithium battery positive electrode material intermediate represented by $Li_{1+a}A_xB_yC_zD_bO_2M_cN_d$; and c) subjecting the high-entropy lithium battery positive electrode material intermediate represented by $Li_{1+a}A_xB_yC_zD_bO_2M_cN_d$ obtained in step b) to surface treatment, and coating, to obtain a high-entropy positive electrode material.

Preferably, in step a), the coprecipitation is performed at a reaction temperature of 50° C.-70° C., at a pH of 11-12, and for a reaction time of 15 h-60 h.

Preferably, in step b), the sintering is performed at a temperature of 700° C.-900° C. for a duration of 10 h-20 h.

Preferably, the step a) further comprises:

washing suspension synthetized by coprecipitation with warm water at 40° C.-60° C., and drying at 90° C.-130° C. for 8 h-14 h, to obtain the precursor.

The present disclosure further provides a lithium battery having high specific energy, comprising:

a positive electrode material, a negative electrode material and an electrolyte, wherein the positive electrode material is the high-entropy positive electrode material described in the above technical solution.

Preferably, the negative electrode material includes one or more of graphite, a silicon carbon material, a tin carbon material, red phosphorus, lithium titanate, white phosphorus, a lithium metal negative electrode material and a lithium carbon negative electrode material.

The present disclosure provides a high-entropy positive electrode material, preparation method and application thereof. The high-entropy positive electrode material has a general formula as shown in the following formula: $Li_{1+a}A_xB_yC_zD_bO_2M_cN_d$, wherein in the formula, A is a metallic element having a valence of +2, B is a metallic element having a valence of +3, C is a metallic element having a valence of +4, D is a metallic element having a valence of +5, M is an element having a valence of +7, and N is an element having a valence of +8; and 0≤a<1, 0<x<1, 0<y<1, 0<z<1, 0<b<1, 0<c<1, d>0. In the present invention, this high-entropy positive electrode material is designed from the structure of the material itself. Compared with the conventional positive electrode materials, it has high specific discharge capacity and has a stable structure during the cycling without oxygen evolution, so that it enables the high-capacity positive electrode material to be applied into a lithium battery system with high specific energy and long cycle, which fundamentally solves the problem of structural stability (as generation) during the charge-discharge cycle of the high-capacity positive electrode material.

In addition, the preparation method provided by the present disclosure has simple process and easy-to-control conditions, can obtain stable products, and has broad application prospects.

BRIEF DESCRIPTION OF DRAWINGS

FIG. 1 is a drawing of charging and discharging data from the first cycle of a half-cell in Example 1 of the present disclosure.

DETAILED DESCRIPTION

Hereinafter the technical solutions of the present disclosure will be described clearly and completely, in conjunction with embodiments of the present disclosure. Obviously, the described embodiments are only part of the embodiments of the present disclosure, rather than all the embodiments. Based on the embodiments in the present disclosure, all other embodiments obtained by a person having ordinary skill in the art without creative labor should fall within the protection scope of the present disclosure.

The present disclosure provides a high-entropy positive electrode material, having a general formula as shown in Formula (I):

$$Li_{1+a}A_xB_yC_zD_bO_2M_cN_d \quad \text{Formula (I);}$$

wherein in Formula (I), A is a metallic element having a valence of +2, B is a metallic element having a valence of +3, C is a metallic element having a valence of +4, D is a metallic element having a valence of +5, M is an element having a valence of +7, and N is an element having a valence of +8;

and 0≤a<1, 0<x<1, 0<y<1, 0<z<1, 0<b<1, 0<c<1, d>0.

In the present disclosure, the high-entropy positive electrode material is a positive electrode material with high entropy feature, specifically a positive electrode material for lithium batteries having performances of high capacity, long cycle life, and high safety (which is mainly reflected in the absence of safety issues such as spontaneous combustion during battery cycling). Currently, the high-capacity positive electrode materials in the existing technology have the problem of poor structural stability during the charge-discharge cycle, for example, a lithium-rich manganese-based positive electrode material has up to 300 mAh/g of a discharge capacity per gram, but has a poor performance due to structure changes during the cycling. In order to solve the problem of poor cycle stability in the battery system with high specific energy, especially the problem of gas generation in full batteries, many researches including doping of the positive electrode material and interface treatment such as surface coating, have been carried out at home and abroad in recent years. However, most of the work is only to delay the time of oxygen release from the material, but cannot fundamentally solve the problem of gas generation during the material cycling. In view of this, in the present disclosure, the high-entropy positive electrode material is designed from the structure of the material itself. Compared with the conventional positive electrode materials, it has high specific discharge capacity and has a stable structure during the cycling without oxygen evolution, so that it enables the high-capacity positive electrode material to be applied into a lithium battery system with high specific energy and long cycle.

In the present disclosure, the high-entropy positive electrode material has a general formula as shown in the following formula: $Li_{1+a}A_xB_yC_zD_bO_2M_cN_d$, wherein in the formula, A is a metallic element having a valence of +2, B is a metallic element having a valence of +3, C is a metallic element having a valence of +4, D is a metallic element having a valence of +5, M is an element having a valence of +7, and N is an element having a valence of +8; and 0≤a<1, 0<x<1, 0<y<1, 0<z<1, 0<b<1, 0<c<1, d>0. Thus, it can be seen that the high-entropy positive electrode material includes lithium having a valence of +1, and oxygen having a valence of +2, +3, +4, +5, or +6 (i.e., a valence of −2), and all elements having a valence of +7 (i.e., a valence of −1), or +8 (i.e., a valence of 0).

In the present disclosure, the metallic element having a valence of +2 preferably comprises one or more of Ni, Be, Mg, Ca, Sr and Ba; the metallic element having a valence of +3 preferably comprises one or more of Co and Al; the metallic element having a valence of +4 preferably comprises one or more of Mn, Al, Ti and Zr; the metallic element having a valence of +5 preferably comprises one or more of Nb, V and T; and the element having a valence of +7 (i.e., a valence of −1) preferably comprises one or more of F and Cl.

In the present disclosure, the element having a valence of +8 (i.e., a valence of 0) is lattice oxygen. Thus, it can be seen that the high-entropy positive electrode material contains an oxygen element having both oxygen having a valence of +6 (i.e., a valence of −2) and oxygen having a valence of +8 (i.e., a valence of 0). In the present disclosure, the high-entropy positive electrode material has the following characteristics during battery charging: when the metallic elements described above are activated sequentially, the lattice oxygen in the material will be activated at the same time, so that the anions and cations are entirely activated to provide the battery with a high specific discharge capacity; meanwhile, the above elements with different valences form constraints with each other to provide the material with a more stable structure, and provide the material with performances of high capacity, high safety, and long cycle life. In addition, the zerovalent electrically neutral oxygen also appears that the material exhibits the electrochemical activity of lattice oxygen at a high voltage above 4.45 V, thus exhibiting high capacity.

The present disclosure further provides a preparation method of the high-entropy positive electrode material described in the above technical solution, comprising the following steps:

a) synthetizing a precursor containing one or more of A, B, C, D, and M through coprecipitation;

b) mixing the precursor obtained in step a) with lithium, and at the same time with one or more oxides containing A, B, C, D, or M, and then sintering to obtain a high-entropy lithium battery positive electrode material intermediate represented by $Li_{1+a}A_xB_yC_zD_bO_2M_cN_d$; and c) subjecting the high-entropy lithium battery positive electrode material intermediate represented by $Li_{1+a}A_xB_yC_zD_bO_2M_cN_d$ obtained in step b), to surface treatment and coating, to obtain a high-entropy positive electrode material.

In the present disclosure, firstly, a precursor containing one or more of A, B, C, D, and M is synthesized through coprecipitation. In the present disclosure, the coprecipitation process is not particularly limited, and the technical means of performing coprecipitation reaction in a reaction kettle which is well known to these skilled in the art can be adopted. In the present disclosure, the coprecipitation is preferably performed at a reaction temperature of 50° C.-70° C., and more preferably 55° C.-65° C. The coprecipitation is preferably performed at a pH of 11-12, and more preferably 11.3-11.45. The coprecipitation is preferably performed for a reaction time of 15 h-60 h, and more preferably 20 h-55 h.

In a preferred embodiment of the present disclosure, the precursor containing one or more of A, B, C, D, and M is a precursor represented by $Ni_{0.08}Co_{0.08}Al_{0.08}Ti_{0.08}Mn_{0.6}(OH)_2$. In another preferred embodiment of the present disclosure, the precursor containing one or more of A, B, C, D, and M is a precursor represented by $Ni_{0.1}Co_{0.1}Mn_{0.4}(OH)_2$. In yet another preferred embodiment of the present disclosure, the precursor containing one or more of A, B, C, D, and M is a precursor represented by $Ni_{0.1}Co_{0.1}Mn_{0.4}(OH)_2$. The coprecipitation described above can be performed by choosing each raw material or preparing a solution of each raw material based on the molar ratio in the above chemical general formula, without any particular limitation in the present disclosure.

In the present disclosure, the step a) further comprises:
washing suspension synthetized by coprecipitation with warm water at 40° C.-60° C., and drying at 90° C.-130° C. for 8 h-14 h, to obtain the precursor,
or more preferably, washing suspension synthetized by coprecipitation with warm water at 45° C.-50° C., and drying at 100° C.-120° C. for 10 h-12 h, to obtain the precursor.

In the present disclosure, after the precursor is obtained, it is mixed with lithium, and at the same time with one or more oxides containing A, B, C, D, or M, and then the mixture was sintered, to obtain an a high-entropy lithium battery positive electrode material intermediate represented by $Li_{1+a}A_xB_yC_zD_bO_2M_cN_d$. In the present disclosure, the lithium and the one or more oxides containing A, B, C, D, or M added at the same time, can be mixed by choosing each raw material or preparing a solution of each raw material based on the molar ratio in the above chemical general formula of the intermediate, without any particular limitation in the present disclosure.

In the present disclosure, the sintering is preferably performed at a temperature of 700° C.-900° C., and more preferably 780° C.-835° C., preferably for a duration of 10 h-20 h, and more preferably 15 h-18 h.

In the present disclosure, after the high-entropy lithium battery positive electrode material intermediate represented by $Li_{1+a}A_xB_yC_zD_bO_2M_cN_d$ is obtained, it is subjected to surface treatment and coating to obtain a high-entropy positive electrode material. In the present disclosure, the surface treatment process is not particularly limited, and the technical means of surface acid treatment to wash away the alkali remaining on the surface of the material, which are well known to these skilled in the art, can be adopted.

In the present disclosure, the coating preferably adopts surface alumina coating well known to these skilled in the art.

The preparation method provided by the present disclosure has simple process and easy-to-control conditions, can obtain stable products, and has broad application prospects.

The present disclosure further provides a lithium battery having high specific energy, comprising:
a positive electrode material, a negative electrode material and an electrolyte, wherein the positive electrode material is the high-entropy positive electrode material described in the above technical solution.

In the present disclosure, the negative electrode material preferably includes one or more of graphite (including natural graphite and artificial graphite), a silicon carbon material, a tin carbon material, red phosphorus, lithium titanate, white phosphorus, a lithium metal negative electrode material and a lithium carbon negative electrode material, more preferably a silicon carbon material, a lithium metal negative electrode material or a lithium carbon negative electrode material, thereby forming a power battery with high specific energy together with the above high-entropy positive electrode material.

In the present disclosure, the electrolyte includes one or more of a liquid electrolytic solution, a gel electrolyte and a solid electrolyte; there is no particular limitation to its source in the present disclosure.

In the present disclosure, the lithium battery having high specific energy preferably includes a separator. In the present disclosure, there is no particular limitation to the separator, and the separator for manufacture lithium batteries well known to these skilled in the art can be used.

In a preferred embodiment of the present disclosure, the lithium battery having high specific energy is a lithium-ion battery. In the present disclosure, the above high-entropy positive electrode material together with a negative electrode material for a conventional lithium-ion battery (e.g., one or more negative electrode materials selected from graphite, a silicon-carbon composite negative electrode material, a tin-carbon composite negative electrode material, red phosphorus, lithium titanate, and white phosphorus), a separator, and an electrolytic solution is assembled into a lithium-ion battery, so as to realize the application of the high-entropy positive electrode material provided by the present disclosure in a lithium-ion battery.

In another preferred embodiment of the present disclosure, the lithium battery having high specific energy is lithium metal battery. In the present disclosure, the above high-entropy positive electrode material together with a lithium metal negative electrode (i.e., one or more of lithium sheet, lithium strip, and lithium foil), a separator, and an electrolytic solution is assembled into a lithium metal battery with high energy density, so as to realize the application of the high-entropy positive electrode material provided by the present disclosure in a lithium metal battery.

In another preferred embodiment of the present disclosure, the lithium battery having high specific energy is a solid lithium-ion battery. In the present disclosure, the above high-entropy positive electrode material together with a negative electrode material for a conventional lithium ion battery (i.e., one or more negative electrode materials selected from graphite, a silicon-carbon composite negative electrode material, a tin-carbon composite negative electrode material, red phosphorus, lithium titanate, and white phosphorus), and a solid electrolyte is assembled into a solid lithium-ion battery, so as to realize the application of the high-entropy positive electrode material provided by the present disclosure in a solid lithium-ion battery.

In another preferred embodiment of the present disclosure, the lithium battery having high specific energy is a solid lithium metal battery. In the present disclosure, the above high-entropy positive electrode material together with a lithium metal negative electrode (i.e., one or more of lithium sheet, lithium strip, and lithium foil), and a solid electrolyte is assembled into a lithium metal battery with high energy density, so as to realize the application of the high-entropy positive electrode material provided by the present disclosure in a solid lithium metal battery.

The present disclosure provides a high-entropy positive electrode material, a preparation method and application thereof. The high-entropy positive electrode material has a general formula as shown in the following formula: $Li_{1+a}A_xB_yC_zD_bO_2M_cN_d$, wherein in the formula, A is a metallic element having a valence of +2, B is a metallic element having a valence of +3, C is a metallic element having a valence of +4, D is a metallic element having a valence of +5, M is an element having a valence of +7, and N is an element having a valence of +8; and $0 \leq a < 1$, $0 < x < 1$, $0 < y < 1$, $0 < z < 1$, $0 < b < 1$, $0 < c < 1$, $d > 0$. In the present invention, this high-entropy positive electrode material is designed from the structure of the material itself. Compared with the conventional positive electrode materials, it has high specific discharge capacity and has a stable structure during the cycling without oxygen evolution, so that it enables the high-capacity positive electrode material to be applied into a lithium battery system with high specific energy and long cycle, which fundamentally solves the problem of structural stability (as generation) during the charge-discharge cycle of the high-capacity positive electrode material.

In addition, the preparation method provided by the present disclosure has simple process and easy-to-control conditions, can obtain stable products, and has broad application prospects.

In order to further illustrate the present disclosure, the following examples are used for detailed description. The reagents used in the following examples are all commercially available.

Example 1

(1) A precursor represented by $Ni_{0.8}Co_{0.8}Al_{0.08}Ti_{0.08}Mn_{0.6}(OH)_2$ was synthetized by a coprecipitation method. A mixed solution having a molar concentration of 2 mol/L of $NiSO_4$, $CoSO_4$, $NaAlO_2$, tetrabutyl titanate and $MnSO_4$ at a molar ratio of 8:8:8:8:60, an ammonia solution having a molar concentration of 1.2 mol/L, and a sodium hydroxide solution having a molar concentration of 5 mol/L were prepared. The prepared mixed solution, ammonia solution, and sodium hydroxide solution were respectively added into a reaction kettle at a volume ratio of 2:0.5:1, to perform a coprecipitation reaction. During the reaction, the temperature of the reaction kettle was controlled at 55° C., and the pH of the system was controlled at about 11.3. After the reaction was performed for 20 h, a suspension of $Ni_{0.8}Co_{0.8}Al_{0.08}Ti_{0.08}Mn_{0.6}(OH)_2$ was obtained. The suspension of $Ni_{0.8}Co_{0.8}Al_{0.08}Ti_{0.08}Mn_{0.6}(OH)_2$ was washed with warm water at 45° C., and dried at 100° C. for 10 hours, to obtain a precursor represented by $Ni_{0.8}Co_{0.8}Al_{0.08}Ti_{0.08}Mn_{0.6}(OH)_2$.

(2) The material precursor described above was mixed with lithium carbonate, LiF, and niobium pentoxide according to the ratio of $Li_{1.2}Ni_{0.08}Co_{0.08}Al_{0.08}Ti_{0.08}Mn_{0.6}Nb_{0.08}O_{2+\delta}F_{0.08}$, and the mixture was sintered at 780° C. for 16 h to obtain a high-entropy positive electrode material.

(3) The above high-entropy positive electrode material for lithium batteries represented by $Li_{1.2}Ni_{0.08}Co_{0.08}Al_{0.08}Ti_{0.08}Mn_{0.6}Nb_{0.08}O_{2+\delta}F_{0.08}$ was subjected to surface acid treatment to wash away the alkali remaining on the surface of material, and then coated with aluminum oxide on its surface to obtain a stable high-entropy positive electrode material for lithium batteries represented by $Li_{1.2}Ni_{0.08}Co_{0.08}Al_{0.08}Ti_{0.08}Mn_{0.6}Nb_{0.08}O_{2+\delta}F_{0.08}$.

(4) The above high-entropy positive electrode material for lithium batteries together with a graphite as a negative electrode material, a separator, and an electrolytic solution was assembled into a lithium-ion battery.

The above material was tested by XPS. As a result, Ni showed a valence of +2 in the material system, Co showed a valence of +3 in the material system, Al showed a valence of +3 in the material system, Ti showed a valence of +4 in the material system, Mn showed a valence of +4 in the material system, Nb showed a valence of +5 in the material system, F showed a valence of −1 in the material system, and O showed a valence of −2 and 0 as electrically neutral oxygen in the material system. The half-cell of the material had a first efficiency up to 93%, and a discharge capacity per gram up to 310 mAh/g. The electrochemical data was shown in FIG. 1. The capacity retention rate of the full battery with its negative electrode graphite in a voltage range of 2.8-4.55 V after 1000 cycles was 92%. Thus, it meets the basic requirement of applications of a power battery with high specific energy.

Example 2

(1) A precursor represented by $Ni_{0.1}Co_{0.1}Mn_{0.4}(OH)_2$ was synthetized by a coprecipitation method. A mixed solution having a molar concentration of 2 mol/L of $NiSO_4$, $CoSO_4$, and $MnSO_4$ at a molar ratio of 1:1:4, an ammonia solution having a molar concentration of 1.2 mol/L, a sodium hydroxide solution having a molar concentration of 4 mol/L were prepared. The prepared mixed solution, ammonia solution, and sodium hydroxide solution were respectively added into a reaction kettle at a volume ratio of 2:2:1.5, to perform a coprecipitation reaction. During the reaction, the temperature of the reaction kettle was controlled at 65° C., and the pH of the system was controlled at about 11.45. After the reaction was performed for 28 h, a suspension of $Ni_{0.1}Co_{0.1}Mn_{0.4}(OH)_2$ was obtained. The suspension of $Ni_{0.1}Co_{0.1}Mn_{0.4}(OH)_2$ was washed with warm water at 50° C., and dried at 120° C. for 12 hours, to obtain a precursor represented by $Ni_{0.1}Co_{0.1}Mn_{0.4}(OH)_2$.

(2) The material precursor described above was mixed with lithium carbonate, nano aluminum oxide, nano titanium dioxide, LiF, and niobium pentoxide according to the ratio of $Li_{1.2}Ni_{0.1}Co_{0.1}Al_{0.1}Ti_{0.1}Mn_{0.4}Nb_{0.1}O_{2+\delta}F_{0.1}$, and the mixture was sintered at 815° C. for 18 h to obtain a high-entropy positive electrode material.

(3) The above high-entropy positive electrode material for lithium batteries represented by $Li_{1.2}Ni_{0.1}Co_{0.1}Al_{0.1}Ti_{0.1}Mn_{0.4}Nb_{0.1}O_{2+\delta}F_{0.1}$ was subjected to surface acid treatment to wash away the alkali remaining on the surface of material, and then coated with aluminum oxide on its surface to obtain a stable high-entropy positive electrode material for lithium batteries represented by $Li_{1.2}Ni_{0.1}Co_{0.1}Al_{0.1}Ti_{0.1}Mn_{0.4}Nb_{0.1}O_{2+\delta}F_{0.1}$.

(4) The above high-entropy positive electrode material for lithium batteries together with a silicon carbon-graphite composite negative electrode material, a separator, and an electrolytic solution was assembled into a lithium-ion battery.

The above material was tested by XPS. As a result, Ni showed a valence of +2 in the material system, Co showed a valence of +3 in the material system, Al showed a valence of +3 in the material system, Ti showed a valence of +4 in the material system, Mn showed a valence of +4 in the material system, Nb showed a valence of +5 in the material system, F showed a valence of −1 in the material system, O showed a valence of −2 and 0 as electrically neutral oxygen in the material system. The half-cell of the material had a first efficiency up to 94%, and a discharge capacity per gram up to 280 mAh/g. The capacity retention rate of the full battery with its negative electrode graphite in a voltage range of 2.8-4.65 V after 1000 cycles was 94%. Thus, it meets the basic requirement of applications of a power battery with high specific energy.

Example 3

(1) A precursor represented by $Ni_{0.1}Co_{0.1}Mn_{0.4}(OH)_2$ was synthetized by a coprecipitation method. A mixed solution, having a molar concentration of 2 mol/L, of $NiSO_4$, $CoSO_4$, and $MnSO_4$ at a molar ratio of 1:1:4, an ammonia solution having a molar concentration of 1.2 mol/L, and a sodium hydroxide solution having a molar concentration of 4 mol/L were prepared. The prepared mixed solution, ammonia solution, and sodium hydroxide solution were respectively added into a reaction kettle at a volume ratio of 2:2:1.5 to perform a coprecipitation reaction. During the reaction, the temperature of the reaction kettle was controlled at 62° C., and the pH of the system was controlled at about 11.45. After the reaction was performed for 55 h, a suspension of $Ni_{0.1}Co_{0.1}Mn_{0.4}(OH)_2$ was obtained. The suspension of $Ni_{0.1}Co_{0.1}Mn_{0.4}(OH)_2$ was washed with warm water at 45° C. and dried at 110° C. for 10 hours, to obtain a precursor represented by $Ni_{0.1}Co_{0.1}Mn_{0.4}(OH)_2$.

(2) The material precursor described above was mixed with lithium carbonate, nano magnesium dioxide, nano aluminum oxide, nano zirconia, LiF, and niobium pentoxide according to the ratio of $Li_{1.2}Ni_{0.1}Co_{0.1}Al_{0.1}Ti_{0.1}Mn_{0.4}Nb_{0.1}O_{2+\delta}F_{0.1}$, and the mixture was sintered at 835° C. for 15 h to obtain a high-entropy positive electrode material.

(3) The above high-entropy positive electrode material for lithium batteries represented by $Li_{1.2}Ni_{0.1}Co_{0.1}Al_{0.1}Ti_{0.1}Mn_{0.4}Nb_{0.1}O_{2+\delta}F_{0.1}$ was subjected to surface acid treatment to wash away the alkali remaining on the surface of material, and then coated with aluminum oxide on its surface to obtain a stable high-entropy positive electrode material for lithium batteries represented by $Li_{1.2}Ni_{0.1}Co_{0.1}Al_{0.1}Ti_{0.1}Mn_{0.4}Nb_{0.1}O_{2+\delta}F_{0.1}$.

(4) The above high-entropy positive electrode material for lithium batteries together with lithium metal as a negative electrode material, a separator, and an electrolytic solution was assembled into a lithium metal battery.

The above material was tested by XPS. As a result, Ni showed a valence of +2 in the material system, Mg showed a valence of +2 in the material system, Co showed a valence of +3 in the material system, Al showed a valence of +3 in the material system, Zr showed a valence of +4 in the material system, Mn showed a valence of +4 in the material system, Nb showed a valence of +5 in the material system, F showed a valence of −1 in the material system, and O showed a valence of −2 and 0 as electrically neutral oxygen in the material system. The half-cell of the material had a first efficiency up to 94%, and a discharge capacity per gram up to 280 mAh/g. The capacity retention rate of the full battery with its negative electrode graphite in a voltage range of 2.8-4.65 V after 1000 cycles was 95%. Thus, it meets the basic requirement of applications of a power battery with high specific energy.

The above description is only the preferred embodiments of the present disclosure. It should be noted that for those skilled in the art, various improvements and modifications may be made without departing from the principle of the present disclosure, and these improvements and modifications should also be considered to fall within the scope of protection of the present disclosure.

The invention claimed is:

1. A high-entropy positive electrode material, having a general formula as shown in Formula (I):

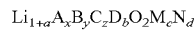
$$Li_{1+a}A_xB_yC_zD_bO_2M_cN_d \quad \text{Formula (I);}$$

wherein in Formula (I), A is a metallic element having a valence of +2, B is a metallic element having a valence of +3, C is a metallic element having a valence of +4, D is a metallic element having a valence of +5, M is an element having a valence of +7, and N is an element having a valence of +8;

and $0 \leq a < 1$, $0 < x < 1$, $0 < y < 1$, $0 < z < 1$, $0 < b < 1$, $0 < c < 1$, $d > 0$;

wherein the metallic element having a valence of +2 is Ni, or Ni and Mg; the metallic element having a valence of +3 is Co and Al; the metallic element having a valence of +4 is Mn and Ti, or Mn and Zr, the metallic element having a valence of +5 is Nb; the element having a valence of +7 is F; and the element having a valence of +8 is lattice oxygen;

wherein the high-entropy positive electrode material contains an oxygen element having both oxygen having a valence of +6 and oxygen having a valence of +8.

2. A preparation method of the high-entropy positive electrode material according to claim 1, comprising the following steps:

a) performing coprecipitation to obtain a suspension, washing the suspension with warm water at 40° C.-60° C., and drying the washed suspension at 90° C.-130° C. for 8 h-14 h, to synthetize a precursor containing one or more of A, B, C, D, and M;

b) mixing the precursor obtained in step a) with a compound containing lithium, and at the same time with one or more oxides containing A, B, C, D, or M, and then sintering to obtain an intermediate of the high-entropy positive electrode material represented by Formula (I)

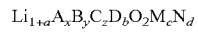
$$Li_{1+a}A_xB_yC_zD_bO_2M_cN_d \quad \text{Formula (I);}$$

wherein A, B, C, D, M, N, a, x, y, z, b, c and d are as defined in claim 1; and c) subjecting the intermediate of the high-entropy positive electrode material represented by Formula (I), $Li_{1+a}A_xB_yC_zD_bO_2M_cN_d$, obtained in step b) to surface treatment and coating, to obtain the high-entropy positive electrode material;

wherein in step a), the coprecipitation is performed at a reaction temperature of 50° C.-70° C., at a pH of 11-12, and for a reaction time of 15 h-60 h; and wherein in step b), the sintering is performed at a temperature of 700° C.-900° C. for a duration of 10 h-20 h.

3. A lithium battery having high specific energy, comprising:
a positive electrode material, a negative electrode material and an electrolyte,
wherein the positive electrode material is the high-entropy positive electrode material according to claim 1.

4. The lithium battery having high specific energy according to claim 3, wherein the negative electrode material includes one or more of graphite, a silicon carbon material, a tin carbon material, red phosphorus, lithium titanate, white phosphorus, a lithium metal negative electrode material and a lithium carbon negative electrode material.

* * * * *